(12) United States Patent
Tam et al.

(10) Patent No.: US 7,158,534 B2
(45) Date of Patent: Jan. 2, 2007

(54) UNIFIED DISTRIBUTED ARCHITECTURE FOR A MULTI-POINT VIDEO CONFERENCE AND INTERACTIVE BROADCAST SYSTEMS

(75) Inventors: Wilson Tam, Singapore (SG); Leonid Kasperovich, Singapore (SG)

(73) Assignee: Imajet Communications, Inc., Singapore (SG)

( * ) Notice: Subject to any disclaimer, the term of this patent is extended or adjusted under 35 U.S.C. 154(b) by 1044 days.

(21) Appl. No.: 09/726,286

(22) Filed: Nov. 30, 2000

(65) Prior Publication Data

US 2002/0066109 A1 May 30, 2002

(51) Int. Cl.
*H04L 12/66* (2006.01)
*G06F 15/16* (2006.01)
*G06F 15/173* (2006.01)

(52) U.S. Cl. ............... 370/467; 370/352; 709/203; 709/226

(58) Field of Classification Search ........ 370/260–267, 370/365–366, 400–422; 709/203–204, 225–245, 709/250, 217–223; 348/14, 15, 16
See application file for complete search history.

(56) References Cited

U.S. PATENT DOCUMENTS

| 5,402,418 | A | | 3/1995 | Shibata et al. ............... 370/264 |
|---|---|---|---|---|
| 5,534,914 | A | | 7/1996 | Flohr et al. |
| 5,617,539 | A | | 4/1997 | Ludwig et al. |
| 5,625,407 | A | * | 4/1997 | Biggs et al. ............ 348/14.11 |
| 5,673,080 | A | * | 9/1997 | Biggs et al. ............ 348/14.09 |
| 5,784,561 | A | | 7/1998 | Bruno et al. |
| 5,841,976 | A | | 11/1998 | Tai et al. |
| 5,914,940 | A | * | 6/1999 | Fukuoka et al. ............ 370/263 |
| 5,936,662 | A | | 8/1999 | Kim et al. |
| 5,963,547 | A | | 10/1999 | O'Neil et al. |
| 5,991,276 | A | | 11/1999 | Yamamoto |
| 5,999,966 | A | | 12/1999 | McDougall et al. |

(Continued)

FOREIGN PATENT DOCUMENTS

EP 0691778 1/1996

OTHER PUBLICATIONS

Ohta et al., "Regional Community Network System," IEICE Transactions on Communications, vol. E79-B, No. 7, pp. 890-898 (Jul. 1, 1996).

(Continued)

*Primary Examiner*—Man U. Phan
(74) *Attorney, Agent, or Firm*—Jones Day (57) ABSTRACT

A unified architecture for a multipoint VC session and interactive broadcasting system is provided that includes a server, one or more video accessing points, reflectors and client machines. The server sets up the video communication sessions (VC sessions), each of which is hosted by one video accessing point. The server downloads the A/V client software to client machines. Reflectors direct audio/visual signals to client machines. The reflectors are coupled to the video accessing point and receive a control signal from the video accessing point in order to direct the A/V signals from the client machines participating in the VC session. The client machines process all of the A/V signals. This system for distributing the VC session tasks across these components reduces any bottleneck effect from using a single, central control point to direct the VC session and route the A/V signals. The server, also, serves as a ticket agent, and is configured to issue and redeem tickets for specific VC sessions and broadcasts through the use of a session booking module. Finally, the downloading process of the A/V client software prevents software incompatibility among participants and enables low storage devices such as handheld devices to participate.

16 Claims, 6 Drawing Sheets

U.S. PATENT DOCUMENTS

| | | | |
|---|---|---|---|
| 6,003,030 A * | 12/1999 | Kenner et al. | 707/10 |
| 6,011,782 A | 1/2000 | DeSimone et al. | |
| 6,112,239 A * | 8/2000 | Kenner et al. | 709/224 |
| 6,195,680 B1 * | 2/2001 | Goldszmidt et al. | 709/203 |
| 6,321,252 B1 * | 11/2001 | Bhola et al. | 709/204 |
| 6,324,169 B1 * | 11/2001 | Roy | 370/260 |
| 6,421,726 B1 * | 7/2002 | Kenner et al. | 709/225 |
| 6,442,758 B1 * | 8/2002 | Jang et al. | 725/119 |
| 6,502,125 B1 * | 12/2002 | Kenner et al. | 709/203 |
| 6,600,725 B1 * | 7/2003 | Roy | 370/261 |
| 6,606,643 B1 * | 8/2003 | Emens et al. | 709/203 |
| 6,633,570 B1 * | 10/2003 | Lovell et al. | 370/400 |
| 6,799,214 B1 * | 9/2004 | Li | 709/226 |
| 6,909,708 B1 * | 6/2005 | Krishnaswamy et al. | 370/352 |
| 2001/0047412 A1 * | 11/2001 | Weinman | 709/225 |
| 2002/0120518 A1 * | 8/2002 | Carney et al. | 705/14 |

OTHER PUBLICATIONS

PCT International Search Report dated Apr. 15, 2002 (4 pgs.).

* cited by examiner

UNIFIED DISTRIBUTED ARCHITECTURE FOR A MULTI-POINT VIDEO CONFERENCE AND INTERACTIVE BROADCAST SYSTEMS

BACKGROUND

1. Technical Field

This patent application is directed to the field of video conferencing and broadcasting systems. More specifically, the invention described herein provides a system and method for conducting a video conference or broadcast (each referred to as a video communications session) over a distributed network in which audio and video signals generated by one or more participants in the video communications session are transported via the network.

2. Description of the Related Art

Videoconferencing systems are known. These systems can be implemented over a network that transmits either analog or digital signals. Multiple users can communicate with each other through these systems using a combination of hardware and software, such as a personal computer having a specialized videoconferencing application. These known systems are built so that all of the audio and video signals (A/V signals) from each of the users are transferred through a central control point and then distributed out to the hardware/software system resident at each user's location. The central control point retrieves A/V signals from each of the participants in the video conference, combines these signals into a single data stream, and then transmits the combined data stream of A/V signals to each of the participants. Each participant in the video conference then receives the same feed as every other participant from the central point in the system.

In order to interpret the A/V data stream transmitted from the central control point to the user machines, each participant typically requires a special-purpose application resident on his video conference hardware (i.e., personal computer). The special-purpose application is typically installed on the user's machine prior to participating in a video conference. The special-purpose application typically requires a significant amount of local storage in order to be properly installed at the user's machine, and this storage is then lost to the special-purpose application regardless of whether the user is presently participating in a video conference.

Furthermore, in these known systems, each participant must retrieve the appropriate special-purpose application prior to participating in a video conference. Each time a new version of the application is introduced, each of the participants must adapt to the software change by downloading and installing the new version. Otherwise, within each video conference, different software applications may be implemented and A/V signals must be directed to different software applications.

These known systems suffer from many disadvantages. First, the central control unit is expensive and does not scale well beyond its initial capabilities. The central control unit is involved in computationally intensive processing of all the A/V signals, administering the video conference, and controlling the A/V signal flow, therefore this control unit may not keep up with the additional load if the number of concurrent video conferences increases. As the number of participants in a video conference increases, the required processing power at the central control unit dramatically follows. In addition, the limited ability of the central control unit to organize, manage, and direct all of the video conferences, may create a bottleneck when used on broadband networks. Second, these systems are also limited by storage constraints of the user's hardware, particularly when the hardware includes handheld devices and PDAs, in which memory storage space is at a premium. Because the special-purpose application must be installed on the user machine, which may not have enough storage space to hold the application, these known systems are typically only used with desktop or workstation machines that have ample memory storage. Furthermore, participants that have loaded the special-purpose application into their machines prior to the video conference are likely to encounter compatibility problems because of different video conference applications or different versions of the same application.

SUMMARY

A multi-point video conference and broadcasting system is provided that includes a server, one or more video accessing points, reflectors and client machines. The server sets up the video communications sessions (VC sessions), which are then hosted by one of the video accessing points. The reflectors are coupled to the video accessing points and direct the audio and visual signals (A/V signals) to client machines. The reflectors receive a control signal from the video accessing points in order to direct the A/V signals to and from the client machines participating in the VC session. The system distributes all of the processing tasks among these components in order to reduce any bottleneck effect from using a single, central control point to direct the VC session and route the A/V signals. The server may also serve as a ticket agent issuing and redeeming tickets for specific video conferences and broadcasts using an included session booking module.

According to one aspect of the invention, a network architecture for a video communications system comprises a server, a video accessing point, and a reflector. The server receives login data from a participant. The video accessing point controls the resources allocated to a VC session based on the login data, and the reflector passes A/V signals to the participants and/or other reflectors as directed by the video accessing point.

According to another aspect of the invention, a method for distributing a VC session over a network comprises the following steps: (1) receiving a request for a VC session; (2) assigning a video accessing point for the VC session request; (3) connecting each participant to a reflector; (4) distributing an A/V signal to each reflector; and (5) sending the A/V signal from each reflector to each participant.

According to another aspect of the invention, a method for distributing video communications client software over a network to a participant in a VC session comprises the following steps: (1) receiving a login request; (2) determining the VC session in which the participant will participate; (3) evaluating the performance of video communications client software over the network; and (4) downloading the video communications client software tuned to deliver the best performance to each participant in the VC session.

According to another aspect of the invention, a method for delivering a ticket to an online event comprises the following steps: (1) setting a time and date for the online event; (2) retrieving a list of participants from a user; (3) assigning a video accessing point to host the event; (4) generating a digital ticket for each of the participants on the list such that the digital ticket includes a reference to the time, date, and video accessing point; and (5) distributing the digital ticket to each participant.

It should be noted that these are just some of the many aspects of the present invention. Other aspects not specified will become apparent upon reading the detailed description of the drawings set forth below.

DETAILED DESCRIPTION OF THE DRAWINGS

Figure 1:
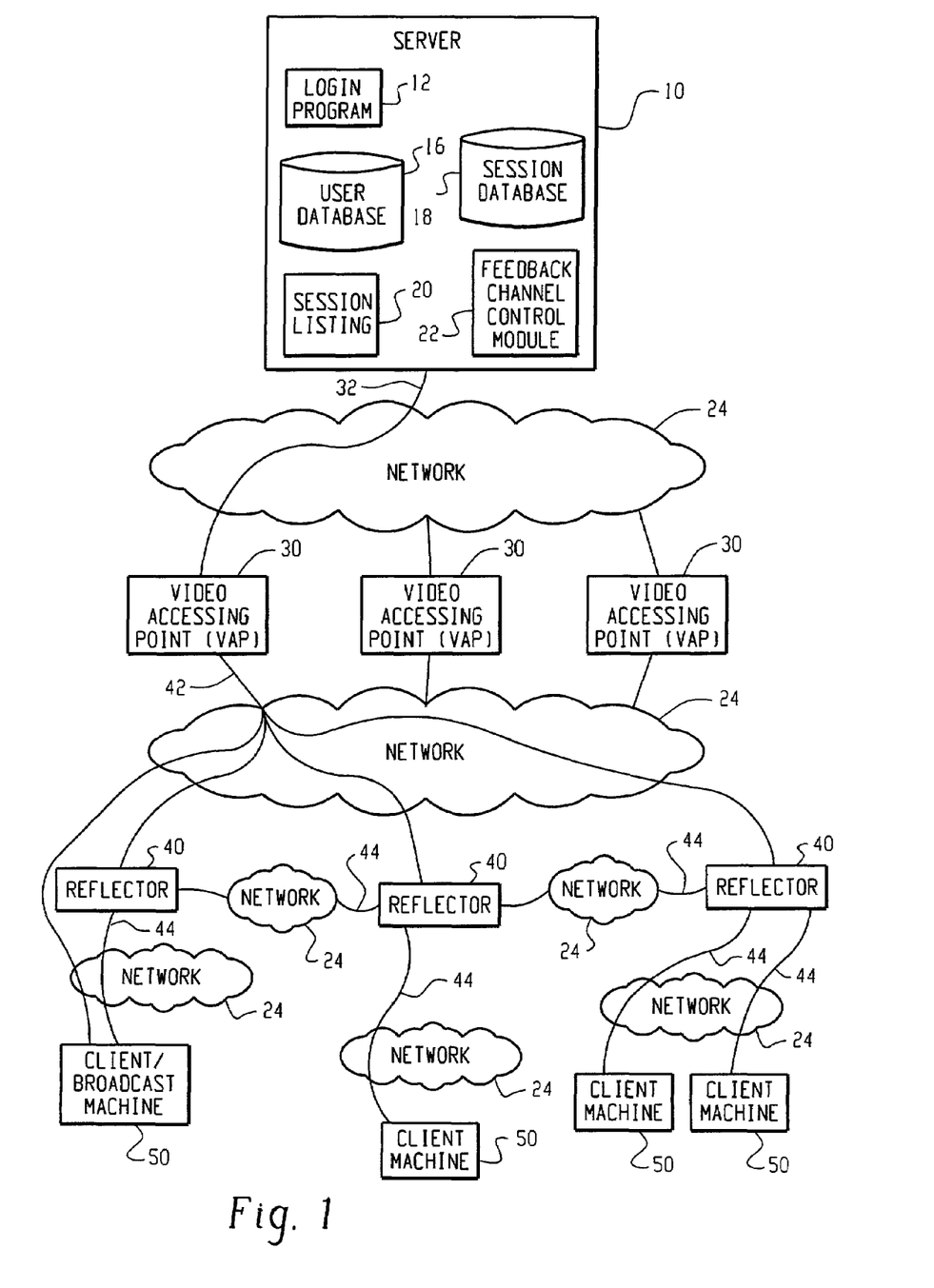
FIG. 1 is a system diagram of an unified, distributed architecture for video conference and broadcast systems according to a preferred embodiment of the present invention.

Turning now to the drawing figures, FIG. 1 is a system diagram of an unified, distributed architecture for video conference and broadcast systems according to a preferred embodiment of the present invention. The architecture includes a server 10, video accessing points (VAPs) 30, reflectors 30, and client machines 50. The server 10 administrates a video communications session (VC session) through a login program 12, user and session databases 16 and 18, and session listing and feedback control module 20 and 22. A network 24 connects the administrative server 10 to the VAPs 30. Each VAP 30 monitors a VC session and communicates to the application server 10 through an administrative link 32. Reflectors 40 communicate with the VAPs 30 through the network 24 via a control signal 42. The reflectors 40 route A/V signals 44 through the network 24 directly or through other reflectors 40, as assigned by the VAP 30, to the client machines 50 participating in the VC session.

The VC session can be administered as a single broadcast session, an interactive broadcast session, or as a participating multi-point video conference. A single broadcast session is a VC session in which a stream of A/V signals from a single broadcaster is delivered to each participant. The participants do not send A/V signals to any of the other participants or the broadcaster. An interactive broadcast session is a VC session in which the broadcaster chooses participants that want to be included. Such a system might be used for a lecture series in which audience participation is sought by the broadcaster. A participating multi-point video conference is a session in which all participants at client machines 50 can send and receive A/V signals. Such a video conference would be used if the participants wanted to discuss issues.

A participant uses the client machine 50 to connect to the server 10 in order to enter a VC session. The participant connects to the server 10 to enter participant information and also to retrieve the necessary software to engage in the VC session. The server 10 transmits the information about the participant to the VAP 30 that is responsible for conducting the VC session that the participant seeks to enter. The client machine 50 receives information about the VAP 30 from the server 10 and then connects to the VAP 30. The VAP 30 then connects to a reflector 40 and controls it by sending a control signal 42 to the reflector 40. Preferably, the reflector 40 is in close geographic proximity to the participant. The client machine 50 begins sending and receiving A/V signals 44 through the reflector 40.

The login program 12, user and session databases 16 and 18 and session listing and feedback control module 20 and 22 within the server 10 can be implemented through a common gateway interface (CGI) to interact with the participant. The login program 12 and the session listing control 20 pass information from the client machine 50 to the databases 16 and 18. The feedback channel control module 22 retrieves information from the VAP module 30 and the databases 16 and 18. Each of these CGI applications within the server 10 comprises a high-level control of the VC session.

The login program 12 retrieves login information from the participant to determine which VC session the participant may enter. Personal information, such as name and password of the participant as well as an IP address for the participant's current connection through the client machine 50, is retrieved by the login program 12. By keeping track of the client machines 50 logged onto the system, the server 10 can control the number of concurrent VC sessions to ensure available resources for all sessions. Within the login program 12, the server 10 provides the participants with a graphical interface to select one of the on-going VC sessions through session listing control 20, or allows the participant to create a new VC session.

The server 10 creates a digital "ticket" for each participant to use in order to access a VC session. Each ticket specifies the date, time, duration and session assignment of the VC session. Using this ticket, the client machine 50 is directed to the VAP 30 that is conducting the VC session and a reflector 40 for receiving and sending A/V signals 44. Each participant in each VC session can thus have a one-time ticket that allows that user to participate in that particular VC session. Similarly, if the participant was invited to participate in a lecture series, for example, then the participant may be issued an event pass that allows the participant to participate in all of the VC sessions associated with the lecture series. The event pass includes a plurality of digital tickets so that the participant has access to all of the VC sessions within the event. Using the digital ticket allows a participant access to a VC session without requiring the login process 12 to query the participant.

In order to schedule a VC session, a participant inputs a list of participants, a start time, and a time length for the VC session to reserve the necessary resources. In this manner, the server 10 can manage and control the number of VC sessions that take place to ensure available resources for all sessions. The server 10 can also manage its own resources by examining the number of participants, the projected locations of the participants, and the lengths of the VC sessions in order to determine an optimal configuration of the reflectors 40 and which VAPs 30 to use for all the VC sessions.

The session listing control 20 generates a list of VC sessions that a participant can enter by searching the session database 18. Access to a particular VC session is determined by comparing the information in the session database 18, such as names of allowed participants, against the name of the participant attempting to access the VC session.

Turning now to the control of the VC session, the VAP 30 is responsible for controlling the VC session by adding new participants to the VC session, and initiating the process of retrieving and sending A/V signals 44 to the reflectors 40 that are associated with the particular VC session. The VAP 30 then monitors each reflector 40 through the control signal 42. The control signal 42 signals the reflector 40 to record an A/V signal 44 from a client machine 50, to send the A/V signal 44 to other reflectors 40, and to retrieve A/V signals 44 from other reflectors 40. The control signal 42 thus instructs the reflectors as to which client machines 50 are participating in the VC session, and accordingly routes A/V signals among the participants.

The VAP 30 oversees the control of a VC session through the control signal 42 to the reflectors 40. Each VC session is preferably controlled through one VAP 30 that manages the participants as they enter and exit the VC session. The participants simply receive and send A/V signals 44 but are not required to manage those A/V signals 44.

The reflectors 40 receive the control signal 42 from the VAP 30 and direct A/V signals accordingly. The reflector 40 communicates with the client machines 50 by delivering the A/V signals 44 of the other participants to the respective client machines 50. The reflector 40 also redirects incoming A/V signals 44 to other reflectors 40 as directed by the VAP 30. By implementing this strategy, the VAP 30 can prevent redundant information from being sent to multiple locations by properly selecting reflector sites and A/V signal paths.

The client machines 50 in the system are end-point terminals, e.g. personal computers with a permanent storage space and memory, or personal access devices with limited memory and storage capacity, which can generate, process and interpret A/V signals, input textual information, and communicate over the network 24. The client machines 50 perform signal processing tasks in order to generate and format A/V signals 44. The other network elements, including the server 10, VAPs 30 and reflectors 40 perform the distributed control and routing functions of the system.

The network 24 may comprise any combination of network topologies. The largest network 24 may be the Internet, which can connect the client machines 50 to the server 10 through a group of nodes within the network 24 using connections along backbone lines provided through the Internet. Smaller networks 24, such as a wide area network (WAN), a metropolitan area network (MAN), a local area network (LAN), or a campus network may connect the client machines 50 to the server 10 or to modules such as the reflectors 40 or the VAPs 30. Networks such as a MAN, LAN and campus network are particularly useful to connect participants who are located geographically close to one another. A reflector 40, proximate to nearby participants, then only requires a single A/V signal from distant participants, and can maintain a peer-to-peer connection between the proximate participants. The use of such geographical relationships is a useful tool in implementing the VC session architecture of the present invention, as will be further discussed below.

By using a hierarchical structure of control strategies, such as shown in FIG. 1, the server 10 may distribute the processing requirements of conducting a VC session among machines that are more proximal to the VC session participants. The server 10 controls the VC session at the highest level of detail. All VC sessions conducted through the system are known to the server 10, as well as who is participating in each session, which VAP 30 is being used in the session, and which reflectors are being used to route the A/V signals. The server 10 does not have to be aware of how much data is being transmitted through the reflectors 40, the routing capacity of the reflector 40, or other low level functions. The VAP 30 manages the transmission rate of the A/V signals 44 as they pass through the reflectors 40. The reflectors 40 send and receive the A/V signals 44 as directed by the VAP 30, and the client machines 50 compress the recorded audio and video into an A/V signal and decompress the audio and video from the incoming A/V signals 44.

A simple strategy for selecting an appropriate reflector 40 may be based on its geographic proximity to a particular client machine 50, provided that the overall network load would not exceed the capacity of the reflector 40. If the selected and assigned reflector 40 has not been involved in routing A/V signals 44 in a particular VC session, then the VAP 30 sends a control signal along the control link 42 to the reflector 40 in order to activate it. In this case, control signals 42 are also sent to the other reflectors 40 involved in the particular VC session in order to update the routing tables with the information of the new routing patterns for the VC session.

For example, a participant at a client machine 50 decides to enter a VC session that is in progress. The participant connects to the server 10 through the network 24. The participant may use the reflector 40 and the VAP 30 that will eventually be assigned to him, but is not required to connect to the server 10 through these machines. The login program 12 retrieves the participant's information through an interface with the client machine 50. A list of available VC sessions is then provided by the server 10. The participant selects the desired VC session and the server 10 will create a digital ticket that is then passed to the client 50. The client can then use the digital ticket to join the session by passing the ticket to the appropriate VAP 30. The VAP 30 then assigns the participant's client machine 50 to a particular reflector 40. The client machine 50 then begins sending an A/V signal 44 to that reflector 40.

In a regular broadcast session, a single broadcasting client machine 50 transmits A/V signals 44 to its reflector 40, while the other client machines 50 only receive a single stream of A/V signals 44. Each reflector 40 involved in the broadcast session receives a single stream of A/V signals 44 and forwards it directly to the client machines 50 and/or other reflectors 40 as specified by the VAP 30. In contrast, in a multi-point video conference, each client machine 50 receives A/V signals 44 from the associated reflector 40 and transmits the participant's A/V signals 44 back to the same reflector 40. Each reflector 40 then delivers multiple streams of A/V signals 44 to each of the client machines 50 connected to that reflector. The reflector 40 also redirects incoming A/V signals 44 to other reflectors 40 involved in the VC session as specified by the VAP 30. In this manner, a particular client machine 50 receives a copy of each stream of A/V signals 44 sent by the other client machines 50.

In an interactive broadcast session, a participant that is initially configured only to receive the A/V signal stream may transmit a request to become an active participant in the VC session. The server 10 consolidates the requests from different participants and generates a list of requests, which may be updated from time to time throughout the VC session. This list is available to the broadcaster 50, the participant who initiated the VC session, who may then select the requests to be granted. The server 10 provides a graphical interface for facilitating the submission of the participant's request and for facilitating the selection process by the broadcaster. Once a particular request is granted and the client machine 50 from which the request was submitted is allowed to interact with the broadcaster's client machine 50, the feedback channel control module 22 will then inform the corresponding VAP 30. The VAP 30 sends a control signal via link 42 to a reflector 40 that is assigned to communicate with the requesting participant's client machine 50. The reflector 40 then enables the client machine 50 to start sending A/V signals 44 to the reflector 40 as directed by the VAP 30.

Utilizing a plurality of geographically-dispersed reflectors 40 that are each located near a group of client machines 50 minimizes the network resources necessary to carry out a VC session. For example, if three client machines 50 are involved in a three-party video conference using a single reflector where two of the client machines 50 are located close to each other, but are geographically distant from the single reflector 40, then, in order to reach the two remote client machines 50, the A/V signal 44 received by the reflector 40 from the first client machine 50 has to be sent twice over the network 24 connecting these remote client machines 50 to the reflector 40. A second reflector resolves this problem by assigning the first reflector 40 to communicate with the first client machine 50 and the second reflector 40, nearer to the two distant client machines 40, to communicate with the other two client machines 50. In contrast to the single reflector scenario, in this dual reflector architecture, only one copy of A/V signal 44 is sent over the network 24 to the remote reflector 40, which in turn routes the A/V signal locally to the two remote client machines 50. The VC session can then minimize bandwidth consumption by implementing this efficient scheme in distributing the A/V signals 44 over the network 24 during a VC session.

Figure 2:
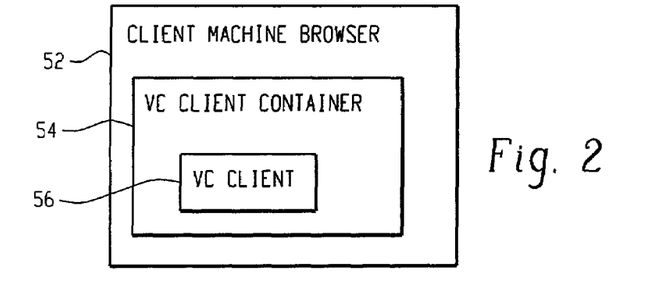
FIG. 2 is a schematic diagram of a downloadable video communications client operating within a browser program at one of the client machines shown in FIG. 1.

FIG. 2 is a schematic diagram of a downloadable VC client 56 operating within a browser program 52 at one of the client machines 50. The VC client 56 is a software program that operates within a VC session client container module 54. The VC client 56 is retrieved from the server 10 (and/or some other component in the system) prior to establishing the connection between the client machine 50 and the VAP 30. Importantly, the VC client 56 is not permanently installed on the client machine 50, but rather is held in volatile memory such as RAM. Alternatively, the VC client 56 may be temporarily stored locally and then deleted after a particular VC session is completed. The advantage of this method is that the permanent resources of the client machine 50 are not taxed by the existence of a special-purpose videoconferencing application in the permanent memory of the client machine. Furthermore, software compatibility issues among the participants in a particular VC session are eliminated because all the participants download the VC client 56 when the VC session begins and thus operate the same version of the VC client 56.

Another advantage of this method is that the server 10, may analyze the network 24 through which A/V signals 44 are passed in order to determine the most appropriate set of parameters of the VC client 56, thus tuning it for a particular group of participants. The tuned parameters of the VC client 56 may have characteristics that optimize the particular structure of the network 24 through which the A/V signals 44 are passed. Typically, such adjustable parameters would specify a quality level of video and audio captured by the client machine 50. Such parameters may include a video resolution and frame rate, a sampling rate of an audio stream, a maximum transmission rate of A/V signals 44, as well as other settings which may affect the performance of the client machine 50 and an overall quality of the audio-visual communication. Also, by analyzing over the network 24 a processing capacity of the client machine 50 the server 10 may determine certain specific features of the client machine 50 (e.g., a hardware platform and operating system) and enable built-in optimizations in the VC client 56 for that particular platform.

For example, if the server 10 recognizes that a number of participants are using PDAs through a CDMA wireless network, then the server might choose a set of parameters for the VC client 56 that optimizes the bandwidth available in a CDMA network. Likewise, another group of participants in a different VC session may connect to the server 10 through an EDGE wireless network, and a different set of VC client parameters may better optimize the bandwidth of that network 24, and thus this tuned VC client 56 would be downloaded to the participants. Once the server 10 has chosen an appropriate set of parameters for the VC client 56, then the process of downloading the VC client 56 may occur.

As described in more detail with reference to FIG. 3, the VC client 56 is responsible for receiving the A/V signals 44, interpreting the A/V signals 44, displaying the A/V signals 44 and recording A/V signals 44 from the participant. As noted, each participant downloads the same VC client 56 when he logs into the server 10 to access a particular VC session.

Figure 3:
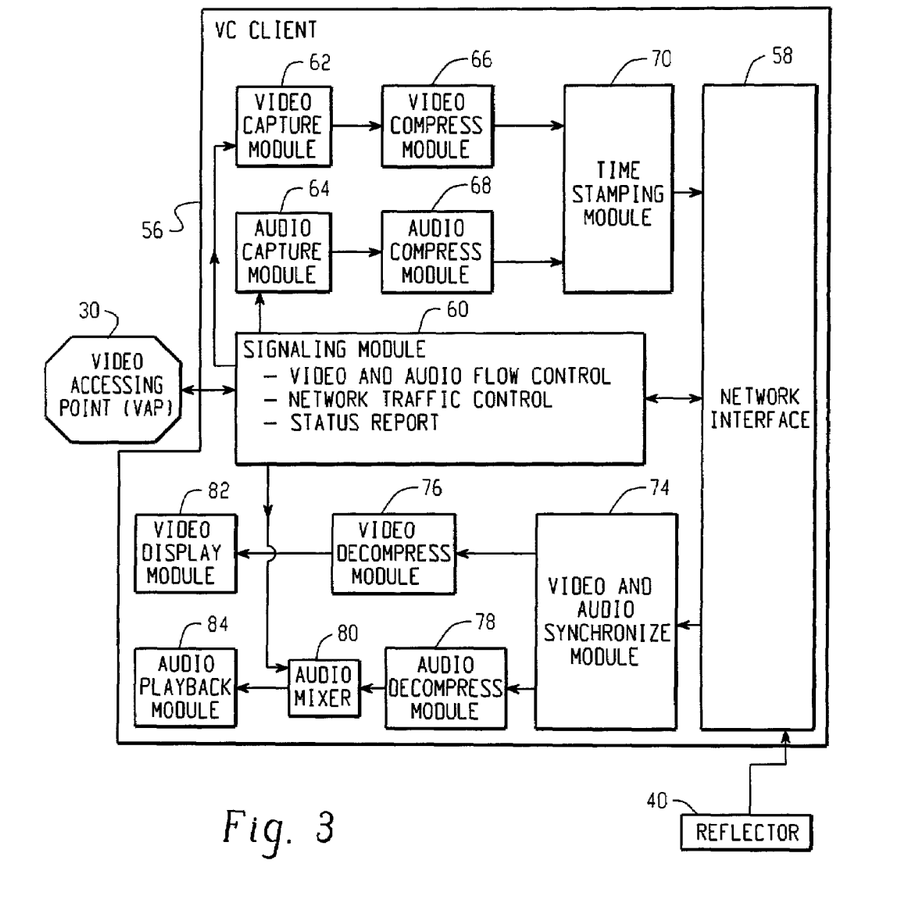
FIG. 3 is a schematic diagram showing the software modules of the downloadable video communications client shown in FIG. 2.

FIG. 3 is a schematic diagram showing the software modules of the downloadable video communications client 56 shown in FIG. 2. The VC client 56 is organized into four major functional code groups, including a network interface 58, a signaling module 60, A/V capture components, and A/V display components. The A/V capture components include video and audio capture modules 62 and 64, video and audio compress modules 66 and 68, and a time stamping module 70. The A/V display components include a video and audio synchronize module 74, video and audio decompress modules 76 and 78, an audio mixer 80, a video display module 82, and an audio playback module 84.

A/V signals 44 are transmitted from the reflector 40 to the VC client 56 through a network interface 58. The network interface 58 is responsible for managing the connection to the network. For example, in a dial-up configuration, such as one used by a home computer, the network connection could be through a modem. For a computer attached to a LAN, the network connection may be through a network interface card (NIC). In both cases, the network interface module 58 communicates with the network hardware of the client machine 50 in order to manage sending and receiving A/V signals 44 to and from the reflector 40 as directed by the signaling module 60.

The VAP 30 communicates with the signaling module 60 of the VC client 56 to direct the processing and displaying of A/V signals 44. The signaling module 60 instructs the capture components to record, compress and time stamp a visual signal and an audio signal from the participant. The signaling module 60 also instructs the display components to synchronize, decompress, mix and display the received A/V signals. As these processes are carried out, the signaling module 60 also monitors the traffic on the network 24 and reports status information of the client machine 50 to the VAP 30.

As instructed by the signaling module 60, the capture components retrieve, compress, and time stamp the audio and video data generated as a result of the participant's activity. The video data stream may be generated by a CCD camera, for example, and the audio stream may be generated by a microphone. The video and audio streams are recorded by the video capture module 62 and audio capture module 64, correspondingly. The video data is compressed in a video compress module 66, and the audio data is compressed in an audio compress module 68.

The time stamping module 70 then time stamps the audio and video signals. This allows the video and audio synchronize module 74 of other participant's VC client 56 to match the audio stream to the video. The time-stamped, compressed A/V signals 44 are then sent through the network interface 58 to the reflector 40. As the capture components capture A/V streams from the participant, the network interface 58 is also receiving A/V signals 44 from other participants through the reflector 40.

The received A/V signals 44 from other client machines 50 are passed through the network interface 58 to the display components for processing. The video and audio synchronize module 74 synchronizes each of the other participants' audio signals with that participant's video signal. Once the audio and visual signals for each of the other participants are synchronized, then the video signal is decompressed in a video decompress module 76 and the audio signal is decompressed in an audio decompress module 78. An audio mixer 80 mixes the audio signals from all participants into a single stream so that the audio can be played on the client machine 50. Each video stream from the other participants is then displayed to the participant through a video display module 82 and the audio is played back to the participant through an audio playback module 84.

The signaling module 60 controls the flow of A/V signals 44 to and from the client machine 50. Instructions for when and from where the client machine 50 receives A/V signals 44 and/or where the client machine 50 should send A/V signals 44 are passed to the network interface 58 from the signaling module 60 as instructed by the VAP 30. The signaling module 60 is also responsible for reviewing the performance of the network connection and for reporting the performance to the VAP 30. In such a manner, the VAP 30 can determine if the performance of the reflector 40 has been compromised, or is below a particular threshold level, and may then stop assigning that reflector 40 to work with new client machines 50 entering the VC session.

As previously noted, the VC client 56 is downloaded at some time relatively close to the time of the VC session. This assures that all participants are using a copy of the same VC client 56, and thus the same A/V coder/decoders (codecs) for compressing and decompressing the A/V signals 44. The VC client 56 does not require multiple codecs to process the A/V signals 44 because each participant is using the same codec. The A/V codecs for each participant will be the same because the initiating participant of the VC session had detailed the time at which the VC session was to begin through the session booking module 14, which had previously invited all participants to the VC session at the proper time, and thus downloaded the same VC client 56.

Figure 4:
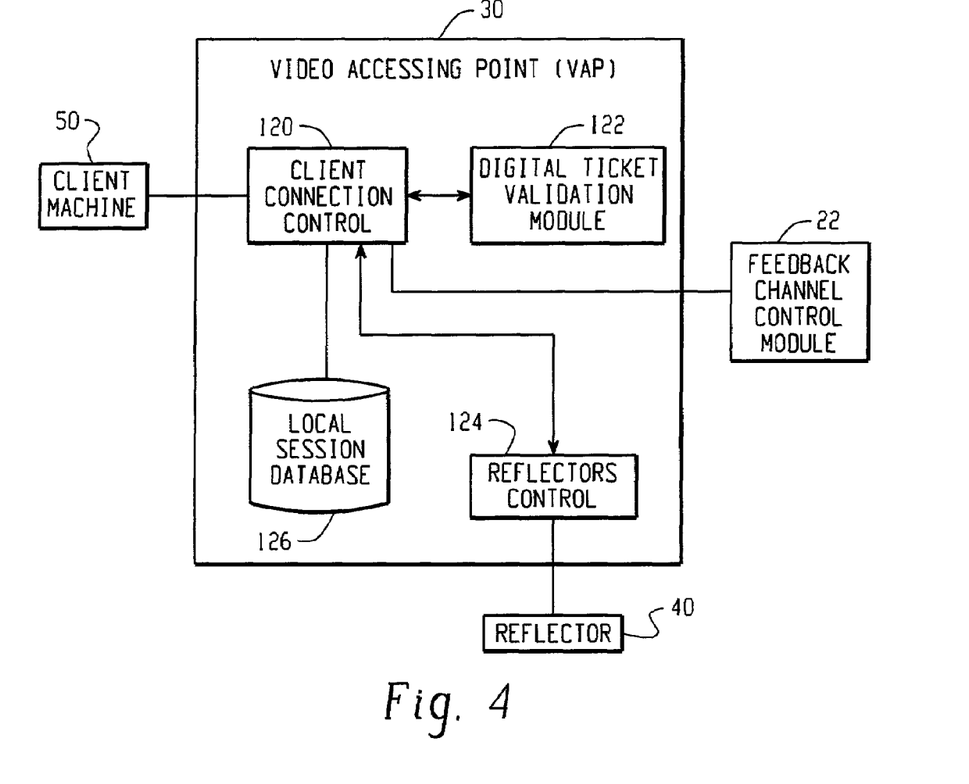
FIG. 4 is a schematic diagram of one of the video accessing points (VAPs) shown in FIG. 1.

FIG. 4 is a schematic diagram of one of the VAPs 30 shown in FIG. 1. The VAP 30 preferably includes a client connection control 120, a digital ticket validation module 122, a reflector control 124, and a local session database 126. The client connection control 120 communicates with the client machine 50 and the feedback channel control module 22. The digital ticket validation module 122 communicates with the client connection control 120 in order to process a digital ticket received from a client machine 50. The reflector control 124 communicates with the client connection control 120 and the reflectors 40 to control reflector assignments and signal paths. The local session database 126 can store information gathered by any of the controls 120–124 as needed by the VAP 30 to further refine the control of the VC session.

Once the client machine 50 has contacted the VAP 30 and the VAP 30 has updated the session database 126 with the assigned reflector 40, then the reflector control 124 passes information about the participant at the client machine 50 to the reflector 40. The reflector 40 then begins sending and/or receiving A/V signals 44 to/from the client machine 50. The client connection control 120 monitors the status and performance of the communication link between the client machine 50 and the reflector 40 through the signaling module 60 of the VC client 56. The VAP 30 is thus responsible for including the participant in the VC session and monitoring the participant during the VC session.

Figure 5:
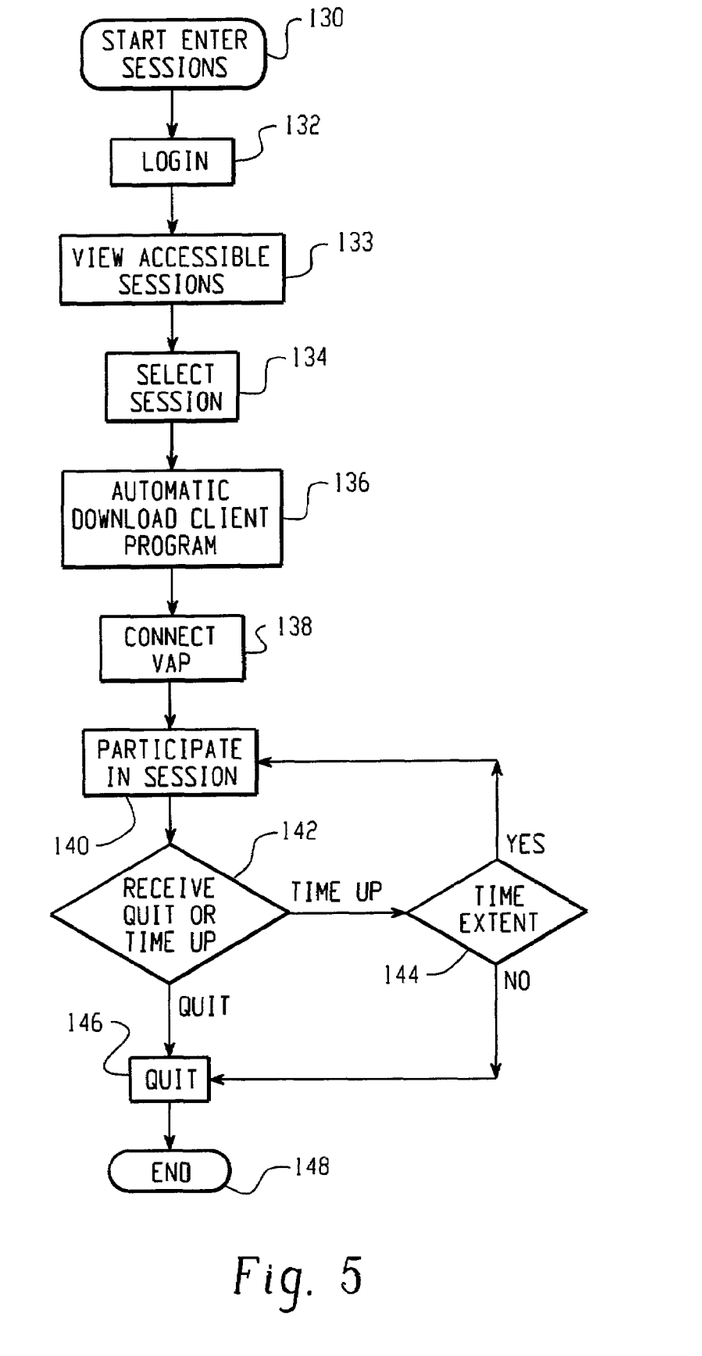
FIG. 5 is a logical flow chart setting forth the preferred steps of a participant entering a video communications session.

FIG. 5 is a logical flow chart setting forth the preferred steps of a participant entering a VC session. The method begins at step 130 when a user accesses the server 10 to participate in a VC session. The user logs in to the server 10 at step 132. A list of accessible VC sessions is generated at the server 10 and presented to the user in step 133. The user then selects a VC session to enter in step 134. The VC client 56 is then downloaded to the client machine 50 in step 136, and the client machine 50 connects to the VAP 30 that is conducting the selected VC session. The user is now a participant in the VC session.

The participant continues to participate in the VC session in step 140 until the VAP 30 receives a quit or time up signal in step 142. If the VAP 30 receives a time-up signal, then the initiating participant determines whether to extend the time in step 144. If the time is extended, then the participant continues to attend the session in step 140. If the session initiator does not extend the time, then the session is terminated, and the session is halted in step 146. Otherwise, if the VAP 30 receives a quit signal from the client machine in step 142, then that participant quits the session in step 146. After the participant quits in step 146, the VAP 30 instructs the reflector 40 to disable the communication link to the participant's client machine 50. If no other A/V signals 44 are being routed by that reflector 40, then the VAP 30 sets the reflector's status to inactive and the reflector 40 is excluded from that VC session.

The login step 132 for joining a VC session can be accomplished through a digital ticket, as described previously. The login step 132, as well as steps 133–136, are preferably carried out by the server 10. Through the steps 142 and 144, the VAP 30 controls the connection between the client machine 50 and the selected VC session. The reflector 40 sends and receives the A/V signals 44 in step 140, and, when directed by the VAP 30, disables the participant's communication link in step 146.

The VC client 56 download step 136 does not occur until the session is selected and a VAP 30 is assigned. This ensures that the VC client 56 used by the participants in the session will be the same. It is possible that some parameters of the VC client 56 may be tuned to make the VC client 56 more efficient within certain networks 24 or VAPs 30.

Figure 6:
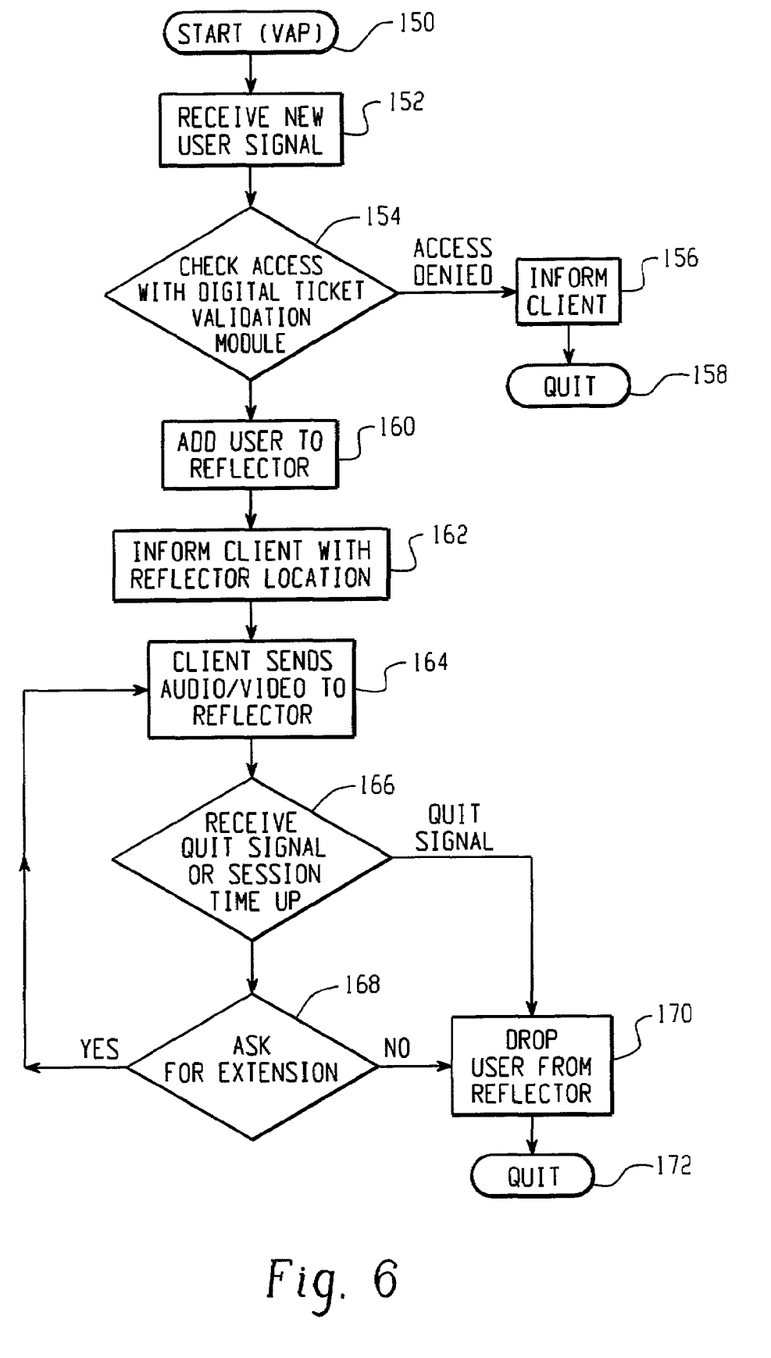
FIG. 6 is a logical flow chart setting forth the preferred steps of organizing and conducting a video conference using the system shown in FIG. 1.

FIG. 6 is a logical flow chart setting forth the preferred steps for organizing and conducting a session using the system shown in FIG. 1. Once the VAP 30 has been assigned to control a VC session and the session has begun, the VAP 30 starts managing the VC session in step 150. The VAP 30 receives a new user signal in step 152. The VAP 30 determines whether the new user is allowed to enter the VC session as a participant in step 154 by validating the digital ticket. If the user is not allowed to participate, then access is denied and the client is notified in step 156. The method then quits in step 158. If the user is allowed access to the VC session, however, then the user's communication link is added to a reflector 40 in step 160. The client machine 50 retrieves the reflector's network address from the VAP 30 through the client connection control 120 in step 162 and the system A/V signals can then be transmitted to and from the client machine 50 through the reflector 40.

The client machine 50 sends/receives A/V signals 44 to/from the reflector 40 in step 164 as the user becomes an active participant in the VC session. The VAP 30 continues to direct the reflector 40 to send the A/V signals 44 to the client machine 50 until a quit signal or session time-up signal is received in step 166 from the client machine 50 or feedback channel control module 22, respectively. A time-up signal in step 168 queries the initiator of the session whether to extend the time of the VC session. If the session initiator decides to extend the time, then the VAP 30 continues to direct the reflectors 40 to receive A/V signals 44 from the client machines 50 at step 164. If the time is not extended, however, then the VAP 30 instructs the reflector 40 to terminate the participants by disabling communication links between their client machines 50 and the reflector 40. A quit signal from a participant at step 166 also instructs the VAP 30 to disable the participant's communication link to the reflector 40 in step 170. Once the communication between the participant's client machine 50 and the reflector 40 is terminated in step 170, then the method quits in step 172.

Figure 7:
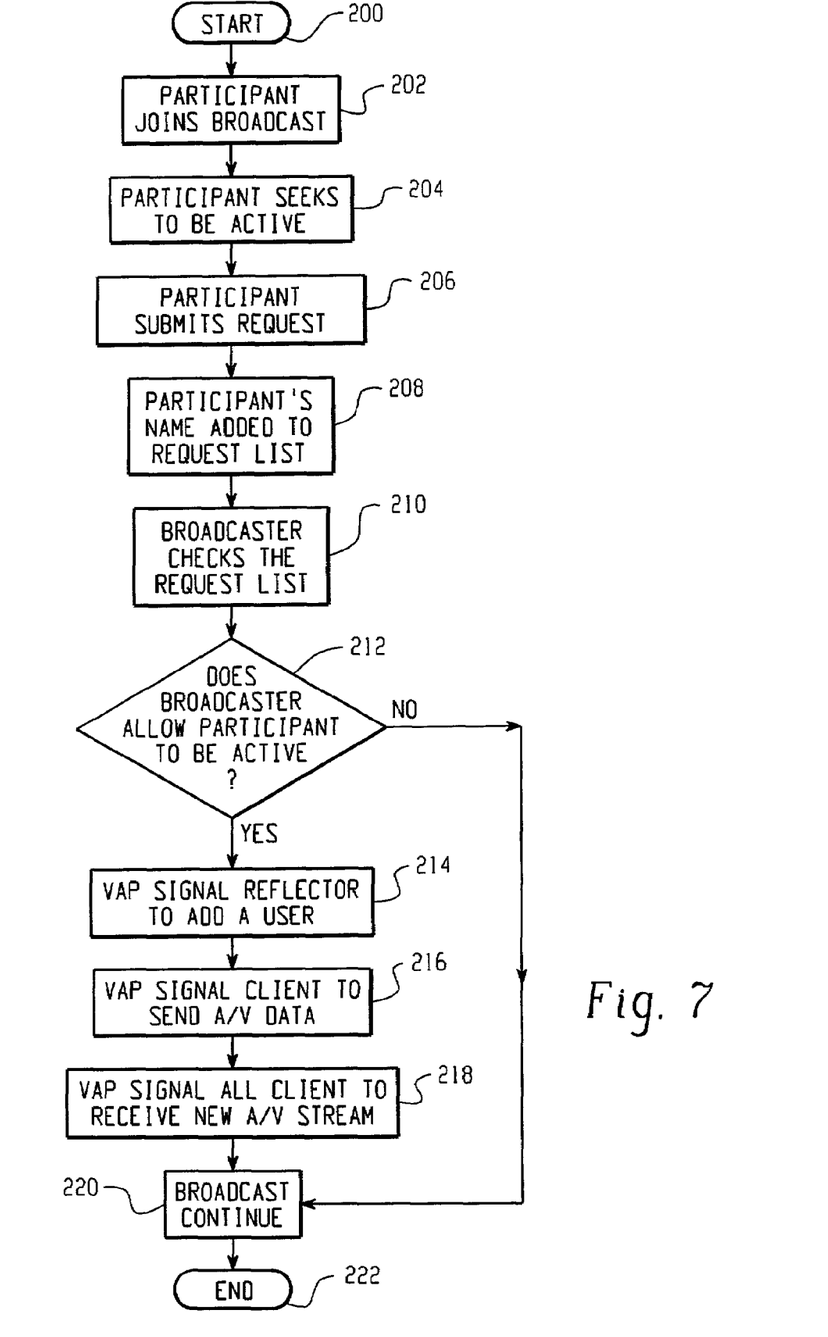
FIG. 7 is a logical flow chart setting forth the preferred steps of a participant interacting with the system shown in FIG. 1.

FIG. 7 is a logical flow chart setting forth the preferred steps of a participant interacting with the system shown in FIG. 1. The method begins at step 200. The participant joins a broadcast session in step 202. The participant then seeks to be active at step 204 and submits a request at step 206. Once the request is received at the server 10, the participant's name is added to a request list at step 208. The broadcaster checks the request list at step 210. If the broadcaster does not allow the participant to become an active participant in step 212, then the broadcast continues at step 220. If the broadcaster allows the participant to actively participate, then the process of adding the participant to the broadcast begins.

After the broadcaster has allowed the participant to be active, the feedback channel control module 22 sends a signal to the VAP 30 to signal the reflector 40 to add a participant in step 214. The VAP 30 then signals the client machine 50 to send A/V signals 44 to the reflector 40 in step 216. Finally, in step 218, the VAP 30 signals all client machines 50 and the broadcaster taking part in the VC session to receive the additional A/V signal 44. The broadcast then continues 220 with the additional participant in the broadcast.

Through the use of this hierarchical command and routing structure for controlling a VC session, no single step or process over-burdens the capacity of the machines 10, 30, 40 and 50 or the network 24. As the process enters each additional step, the machines 10, 30, 40 and 50 each have higher bandwidth requirements, but are subject to less traffic. For instance, the server 10 may be providing the interface and decision making tools for 100 concurrent VC sessions. Each VAP 30 may be responsible for 10 VC sessions. Each reflector may be assigned to one VC session, but be responsible for multiple client machines 50. The client machines 50 are responsible for the most computationally intensive task, which is to compress and decompress the audio and video streams from the other participants, but each client machine 50 is only responsible for a single participant. Using this structure, a distributed multi-point video conference and broadcast system is provided that overcomes the disadvantages of known video communications systems.

Having described an example of the invention by way of the drawing figures, it should be understood that this is just one example of the invention, and nothing set forth in this detailed description is meant to limit the invention to this example. Other embodiments, improvements, substitutions, alternatives, or equivalent elements and steps to those set forth in this application are also meant to be within the scope of the invention.

The following is claimed:

1. A network architecture for a video communications system, comprising:
    a server for receiving login data for a video communications (VC) session from a plurality of participants, each participant being associated with a client machine;
    a controller configured to control the VC session based on the login data; and
    a plurality of geographically-dispersed reflectors;
    the plurality of reflectors each being configured to service one or more client machines based on a network proximity between the reflector and the client machine;
    the controller being operable to configure one or more of the reflectors based on the login data for the purpose of routing audio/visual (AV) data between two or more client machines; and
    an audio/visual viewer comprising:
        a network interface configured to receive audio/visual signals from a plurality of participants;
        a codec for compressing and decompressing audio/visual signals;
        a mixer for mixing the audio signals transmitted from a plurality of participants; and
        a video display for displaying the video signals transmitted from a plurality of participants such that the video display simultaneously displays each visual signal from each participant of the plurality of participants.

2. The network architecture of claim 1, wherein at least one of the reflectors is co-located with at least one of the client machines.

3. The network architecture of claim 1, further comprising a video communications client program operating on a participant's client machine, where the client program includes an audio/visual viewer configured to display the audio/visual signal received from the reflector.

4. The network architecture of claim 3, wherein the audio/visual viewer comprises a codec for compressing and decompressing video images and sound.

5. The network architecture of claim 3, wherein the reflector can direct a peer-to-peer connection between the audio/visual viewers of the participants.

6. A method for distributing a video communications session over a network to a plurality of client machines, comprising the steps of:
    receiving a request for the video communications session;
    assigning a controller for the video communications session request;
    using the controller to configure a plurality of geographically-dispersed reflectors to route audio/visual (AV) data between a plurality of client machines, wherein each of the reflectors is assigned to one or more of the client machines based on a network proximity between the reflector and the client machine;
    receiving a login request from a VC session participant;
    determining a VC session in which the participant will participate based on the login request;
    evaluating the performance of audio/visual processors over a network implementing the VC session;
    downloading an audio/visual processor to each participant of the VC session based on the audio/visual processor evaluation; and transmitting AV data between the plurality of client machines using the configured reflectors.

7. The method of claim 6, wherein the step of transmitting AV data between the plurality of client machines further comprises compressing the AV data.

8. The method of claim 7, further comprising the steps of:
receiving the audio/visual data at one of the client machines;
decompressing the audio/video data at the one client machine; and
displaying the audio/video data signal at the one client machine.

9. The method of claim 7, wherein the compressing step occurs at one of the client machines.

10. The method of claim 6, wherein the audio/visual processor comprises a codec for compressing and decompressing video images and sound.

11. The method of claim 6, further comprising the step of:
removing the audio/visual processor from the client machine after the VC session is complete.

12. The method of claim 6, further comprising:
setting a time and date for an online event;
retrieving a list of participants in the online event from a first user;
generating a digital ticket for each of the participants on the list such that the ticket includes a reference to the time, date, and controller; and
distributing the digital ticket to each participant.

13. The method of claim 12, wherein the distributing step comprises sending an email to each participant.

14. The method of claim 12, wherein the ticket comprises a URL having an individual code for each participant.

15. The method of claim 14, wherein the URL passes a set of codes to a CGI script.

16. The audio/visual viewer of claim 1, further comprising a time stamp configured to stamp a time to each participant's audio and video signals.

* * * * *